Sept. 2, 1930.  H. STARCK  1,774,733
ANGLE PIECE FOR DENTAL PURPOSES COMPRISING A HANDLE SLEEVE
Filed Feb. 17, 1928  2 Sheets-Sheet 2
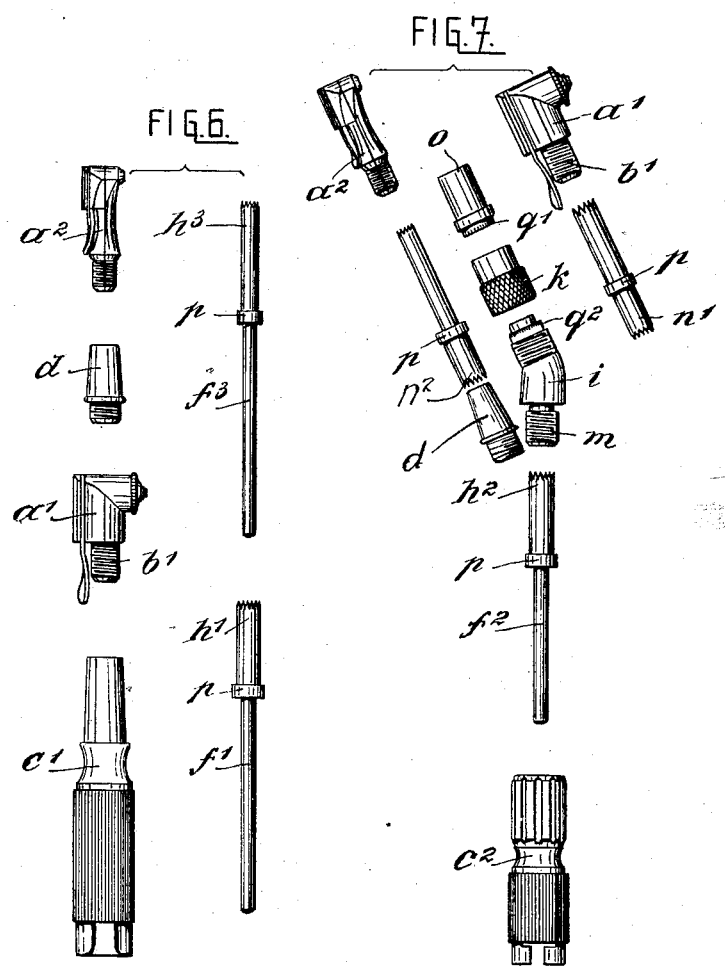
Inventor
HANS STARCK Patented Sept. 2, 1930

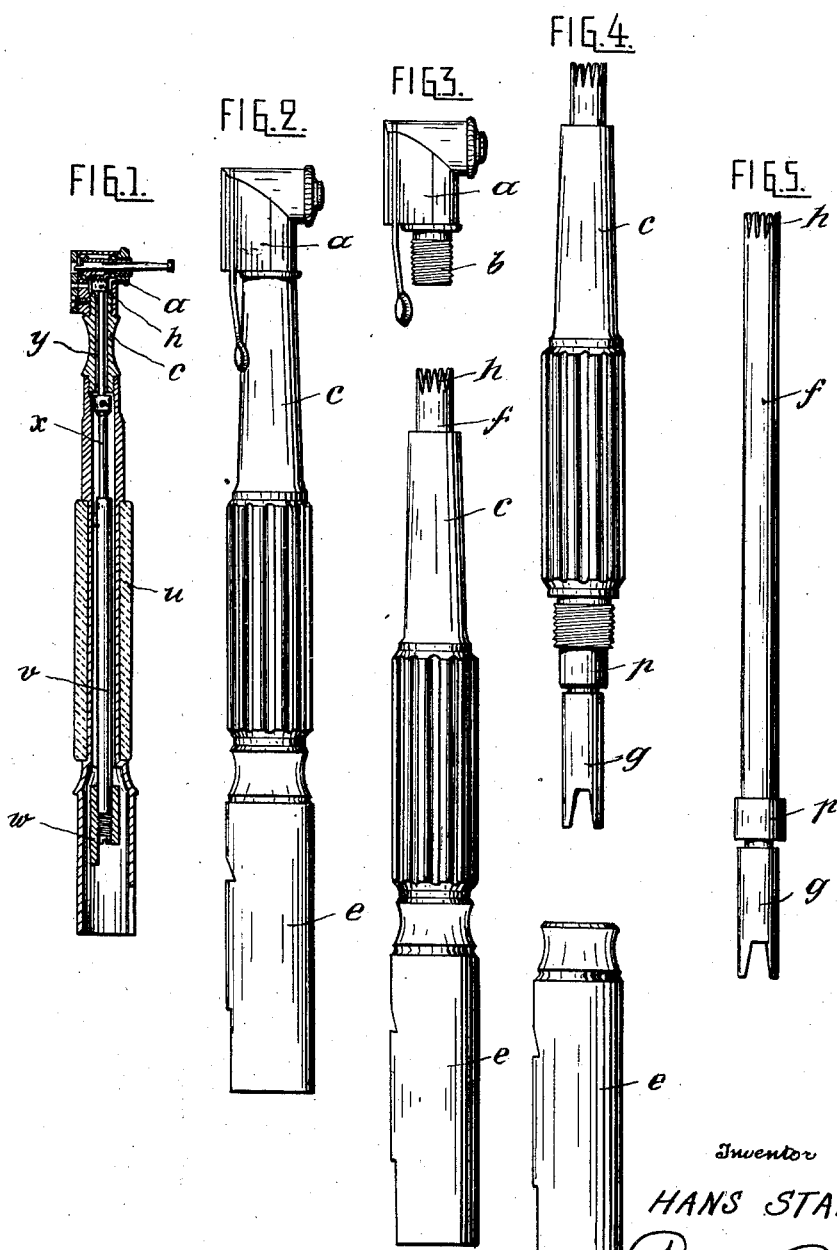

1,774,733

UNITED STATES PATENT OFFICE

HANS STARCK, OF BERLIN-HERMSDORF, GERMANY, ASSIGNOR TO DEUTSCHE GOLD-UND SILBERSCHEIDEANSTALT VORMALS ROESSLER, OF FRANKFORT-ON-THE-MAIN, GERMANY

ANGLE PIECE FOR DENTAL PURPOSES COMPRISING A HANDLE SLEEVE

Application filed February 17, 1928, Serial No. 255,025, and in Germany September 17, 1927.

The invention relates to angular tools, particularly for dental purposes, and permits of a substantial simplification in the production and use thereof.

Hitherto it was usual to produce the so-called lower drive of the angular tool head and the driving shaft of the hand piece as separate parts, which were then pinned together. In these cases the lower drive was of larger diameter than the driving shaft and the rear annular surface of the lower drive was supported by a sleeve screwed to the handle.

In the drawings, Fig. 1 is a longitudinal sectional view of an angle-piece of a type hitherto commonly used.

Fig. 2 is a side elevation of an assembled angle-piece of my invention.

Fig. 3 is a side elevation of the angle-piece shown in Fig. 2 with the tool head separated from the handle sleeve.

Fig. 4 is a side elevation of the angle-piece shown in Fig. 2 with the tool head removed and the sliding connecting sleeve separated.

Fig. 5 is a side elevation of the handle shaft used in the construction shown in Figs. 2, 3 and 4.

Fig. 6 shows side elevations of various interchangeable parts which may be used to build up various types of angle-pieces.

Fig. 7 shows side elevations of various interchangeable parts which may be used to build up various types of angle-pieces including contra angle-pieces.

In Figure 1 of the drawings is illustrated an angular tool of the type hitherto generally used. The angular tool head $a$, on the known construction of which it is not necessary to enter here into further detail, is screwed to a sleeve $c$ of which the other end is screwed to the handle sleeve $u$. In the boring of the sleeve $u$ is mounted the driving shaft $y$ of which the lower end can be connected by a driver $w$ or in any other manner to the flexible shaft leading to the motor (not shown in the drawing). From the drawing it will be seen that the shaft $y$ is pinned to an intermediate member $x$ of which the front end is screwed to the shaft $y$ mounted in the sleeve $c$. The front end of the shaft $y$ is pinned to the lower drive $h$ of the angular tool head, of which the diameter exceeds the diameter of the shaft $y$ so that the lower annular surface of the lower drive $h$ is supported from the front annular end surface of the sleeve $c$.

From this figure it will be clear that the separate parts, especially the shafts $w$, $v$, $x$, $y$, $h$ can only be separated and exchanged with difficulty. In order to remove the shafts it is necessary, firstly to unscrew the angular tool head $a$, then to release the sleeve $c$ from the sleeve $u$, whereupon the screw connection between the shaft parts $x$ and $y$ must be released in order finally to be able to remove the parts $y$, $h$ upwardly and the parts $x$, $v$, $w$, downwardly.

This has the disadvantage that the cleaning of such an angular tool, which is unavoidable in dentistry for hygienic purposes, can only be effected with difficulty. The invention eliminates this disadvantage in that the shaft of the handle and the lower drive of the angular tool head consist substantially of a single member passing right through, which after unscrewing a sleeve provided at the lower end of the handle grip can be pushed out downwardly without difficulty. This construction also possesses the essential advantage of simplicity and cheap possibility of construction as the various parts of the shafts and their screw connections and pin connections, as also the difficult production of the small lower drive toothed gears and finally also the separate bearing sleeve $c$ for the upper part of the shaft are omitted.

Figures 2 to 5 illustrate an example of construction of the new angular tool. The angular tool head $a$ is provided with a screwed extension $b$ which fits into a corresponding screw thread of the handle sleeve $c$, which is bored in such a manner that the handle shaft $f$ can be inserted as illustrated in Figure 4, the front end thereof being in accordance with the invention provided with a lower drive $h$ for the angular tool head. The other end of this shaft is provided with a driver $a$ which serves to connect the shaft to the driven shaft, for example with a flexible shaft. Further there is provided at this end of the shaft a collar ring $p$ of which the distance from the lower drive $h$ is so dimensioned that the lower drive accurately co-operates with the upper drive of head when the collar ring rests against the handle sleeve $c$. The collar ring $p$ serves for taking up the thrusts acting on the driving shaft in the direction of the angular tool head. The ring $p$ and the driver $g$ may be drawn in the known manner on the shaft $f$ or in accordance with the invention formed integral therewith.

The assemblage of the separate parts is effected as follows: Firstly, the head $a$ is screwed to the sleeve $c$, then the shaft $f$, illustrated in Figure 5, if fitted until the collar ring comes into engagement, whereupon the sliding connecting sleeve $e$ is drawn over and is screwed to the sleeve $c$. When separating the angular tool it is only necessary to remove the sliding connecting sleeve $e$ in a suitable manner, whereupon the shaft with the driver can be removed in order to clean this for example.

The most essential advantage of this construction however consists therein that it enables the various parts of an angular tool to be exchanged with the parts of other sizes or types of angular tools with a few manipulations so that the separate parts can be assembled to form angular tools of suitable shape and size. From this it follows that a complete set of tools with a much smaller number of details can be obtained than hitherto. Whilst, for example, for a complete set of different angular tools seventy parts were hitherto necessary, the construction according to the invention enables the same number of tools to be produced with less than half the details, as will be described further with reference to Figures 6 and 7.

To the screw $b^1$ of the angular tool head $a^1$ can be screwed as desired the handle sleeves $c^1$ (Figure 6) or $c^2$ (Figure 7). When the longer sleeve $c^1$ is used the shaft $f^1$ is fitted into this, whereas when using the shorter sleeve $c^2$ the shorter shaft $f^2$ is used for the drive. In this case the parts are so dimensioned that when the collar ring $p$ bears against a bearing surface provided in the interior of the handle sleeve, the lower drive $h$ and the shaft is in engagement with the upper drive of the angular tool head $a$.

In order, for example, to engage a so-called miniature angular tool head $a^2$ to be fitted on the sleeve $c^1$, the head $a^1$ is unscrewed and the shaft $f^1$ is removed. Hereupon the miniature shaft $f^3$ is fitted into the sleeve $c^1$, the lower drive $h^3$ being of correspondingly smaller diameter and of somewhat greater length. Then the reducing member $d$ is fitted over the lower drive $h^3$ and screwed to the sleeve $c^1$, whereupon the miniature angular tool head $a^2$ can be screwed to the reducing member $d$. Also in this case the parts are so dimensioned that when the collar ring $p$ bears against the stop in the sleeve $c^1$ the lower drive $h^3$ is in engagement with the upper drive of the angular tool head $a^2$.

A further possibility of application of the invention can be seen from the parts $i, k, m, n$ and $o$ of Figure 7, which are adapted for so-called contra angular tools. In this case, for example, there is fitted over the shaft $f^2$, which for example is surrounded by the sleeve $c^2$, the kneepiece $i$ and screwed by the screw thread $m$ to the sleeve $c^2$, whereupon the shaft $n^1$ is fitted into the front portion of the knee piece $i$ so that it is in engagement with the drive $h^2$ of the shaft $f^2$ which is secured by the collar ring $p$ of the shaft $n^1$ and by the lock nut $k$. After drawing over the sleeve $o$, of which the teeth $q^1$ co-operate with the teeth $q^2$ of the knee piece $i$ for the purpose of adjustability of the angular tool head, the angular tool head $a^1$ is screwed to the part $o$ so that the upper drive of the angular tool head comes into engagement with the front teeth of the shaft $n^1$.

If it is desired to obtain a so-called miniature contra angular tool it is only necessary to replace the shaft $n$ by the longer shaft $n^2$, which however is smaller in diameter, and after inserting a reducing member $d$ (Figure 6) to fit on the miniature head $a^2$.

In this manner it is possible to obtain a number of further combinations between the parts illustrated and those not illustrated without it being necessary for the illucidation of the invention to go into further detail. It may however be mentioned that the invention is not only applicable to angular tools, of the most diverse character, but also to other dental appliances. Particularly it is not essential in respect of the invention as to the number of shafts which are inserted between the flexible driving shaft and the tool holder; it is only essential for these shafts to be composed or formed of one piece in such a manner that after releasing a sleeve they can be withdrawn and replaced by another one.

I claim:

1. Angle-piece for dental purposes comprising a handle sleeve, a driven handle shaft in said sleeve, a toothed drive formed in said shaft, a collar on said shaft cooperating with an abutment in said sleeve, a knee piece detachable on said sleeve, a shaft in said knee piece, a collar on said shaft cooperating with an abutment in said knee piece, a toothed drive formed in one end of said shaft cooperating with said toothed drive formed in said handle shaft, a second toothed drive formed in the other end of said shaft, a reducing member detachable on said knee piece, an angular tool head detachable on said reducing member, driving means in said tool head cooperating with said second drive of said knee piece shaft and means for fastening tools in said tool head.

2. An angle piece for dental purposes comprising a handle sleeve interiorly threaded at its upper end, a one piece rigid drive shaft provided with a fixed abutment rotatably mounted within said handle sleeve, driving teeth on one end of said drive shaft, a knee-piece having an externally threaded end for engagement with the aforesaid threads in the handle sleeve, said knee-piece being provided with external threads and an internal bearing surface at its other end, an intermediate drive shaft adapted to be journalled in said bearing surface in the knee piece and engaging the first said drive shaft, an intermediate sleeve surrounding said intermediate drive shaft, means associated with the knee-piece and intermediate sleeve to prevent relative rotation between the two, a lock nut, means associated with the lock nut and intermediate drive shaft to prevent longitudinal movement in one direction between the two, and a tool carrying head removably and detachably secured to the intermediate sleeve, the upper end of the intermediate drive shaft being provided with teeth for driving a tool in the tool carrying head.

3. An angle piece for dental purposes comprising the combination of a handle sleeve, a reducing member, an angular tool carrying head, means for detachably connecting one end of said reducing member with the angular tool carrying head, means connecting the other end of the reducing member with the handle sleeve, a drive shaft rotatably mounted within said handle sleeve, and means for establishing a driving connection between said drive shaft and a tool carried by said angular head.

4. In an angle piece for dental purposes comprising an angular head adapted to carry a tool, a handle sleeve, a shaft rotatably mounted in said handle sleeve, and means associated with said shaft for driving the tool carried by said head, the combination of a reducing member, means for detachably connecting one end of said reducing member with the head, and means connecting the other end of said reducing member with the handle sleeve, the reducing member surrounding a portion of the tool driving means.

5. In an angle piece for dental purposes comprising an angular head adapted to carry a tool, a handle sleeve, a shaft rotatably mounted in said handle sleeve, and means associated with said shaft for driving the tool carried by said head, the combination of a reducing member, means for detachably connecting one end of said reducing member with the head, and means for detachably connecting the other end of said reducing member with the handle sleeve, the said head, reducing member, handle sleeve, shaft, and tool driving means being readily detachable to permit a selective substitution of similar elements.

6. In an angle piece for dental purposes comprising an angular head adapted to carry a tool, a handle sleeve, a shaft rotatably mounted in said handle sleeve, a means associated with said shaft for driving the tool carried by said head, the combination of a reducing member, a knee piece, means for detachably connecting one end of said reducing member with one end of the knee piece, means for detachably connecting the other end of said knee piece with the handle sleeve, and means for detachably connecting the end of said reducing member remote from said handle sleeve with the said angular head, the said head, reducing member, knee piece, handle sleeve, shaft, and tool driving means being readily detachable to permit a selective substitution of similar elements.

7. An angle piece for dental purposes comprising the combination of a handle sleeve, a one piece rigid drive shaft provided with a fixed abutment rotatably mounted within said handle sleeve, a knee piece, means for detachably connecting one end of said knee piece with the handle sleeve, an intermediate drive shaft mounted for rotation within said knee piece and adapted to operatively engage the first said drive shaft, an intermediate sleeve surrounding said intermediate drive shaft, a lock nut, means associated with the lock nut and intermediate drive shaft to prevent lateral movement between the two, a reducing member detachably secured to said intermediate sleeve, a tool carrying head detachably secured to the reducing member, and means for establishing a driving connection between said intermediate drive shaft and a tool carried by said angular head.

In testimony whereof I affix my signature.

HANS STARCK.